Jan. 11, 1955     TADAICHI HASHIMOTO     2,699,409
SYNTHETIC LIGHTWEIGHT AGGREGATE
Filed Sept. 26, 1950
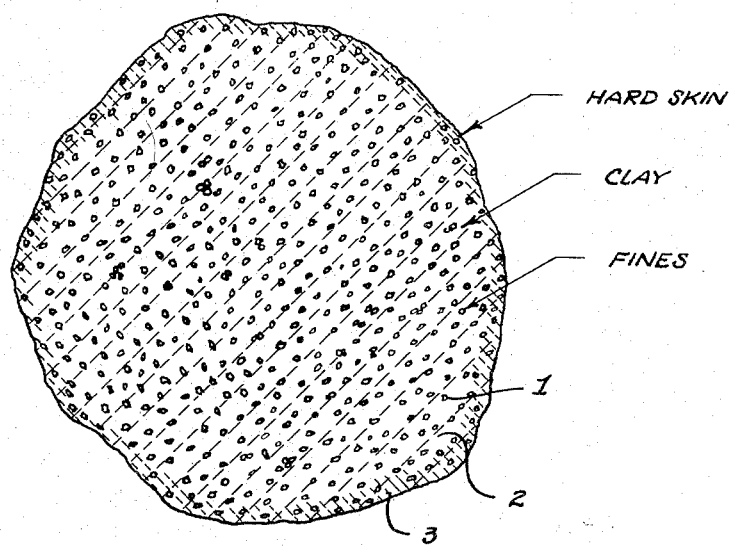
INVENTOR.
TADAICHI HASHIMOTO
BY
Gordon C Mack
ATTORNEY

United States Patent Office 2,699,409
Patented Jan. 11, 1955

2,699,409

SYNTHETIC LIGHTWEIGHT AGGREGATE

Tadaichi Hashimoto, Denver, Colo., assignor to Research Counsel, Inc., Denver, Colo., a corporation of Colorado Application September 26, 1950, Serial No. 186,797

3 Claims. (Cl. 117—100)

This invention relates to synthetic light-weight aggregate suitable for use in concrete, plaster, building forms, e. g. wallboard, blocks, tile, etc., and the like. The particles of the aggregate are not only light weight but they are substantially impervious to liquids. They are formed from perlite fines and clay.

Perlite ore is expanded or "popped" by heating in order to obtain perlite granules for the market. In this operation a high percentage of porous fines is produced. These fines are powdery and dust like. They are not suitable for the normal uses of perlite granules, such as, for example, aggregate for use in concrete, plaster, etc. The popped material is separated by air classification. The material which is too small for use as plaster or concrete aggregate is defined in A. S. T. M. specification C-130-42, and is called "fines" in the industry.

According to this invention these fines are agglomerated with clay. The fines may be mixed with the clay in dry form and water subsequently added. Alternatively, the clay may be first suspended in water and the fines added to the suspension. As a further alternative the fines may be suspended in water and the dry clay mixed with this. The fines and clay may be separately suspended in water and the two suspensions mixed. The fines and clay and water may be mixed in any desired manner.

The preferred clay for this use is bentonite, but any clay may be employed. All clays, after being wet to form a plastic and then being dried, form porous products. Fines from the popping of perlite are extremely porous and the agglomerates or pellets formed from the fines and clay are very porous and light in weight. They are particularly suited for use in concrete and plaster, and also in building forms such as wallboard, blocks, etc. The porosity of the pellets makes the concrete, etc. not only light in weight, but also tends to make it sound deadening and heat and cold insulating. To preserve the porosity of the pellets when mixed with a slurry of cement, etc. in the manufacture of concrete and the like, their surface is provided with a dense skin of the same composition as the balance of the pellet. The skin is so dense as to be substantially water impervious. This skin may be formed by glazing the surface or by rubbing the surface of the pellet, and drying and firing as by rolling it while wet in a pan or cylinder or other suitable apparatus, such rolling may be carried on as a part of the drying and firing operation, particularly where the production of the surface skin, the drying and the firing are carried out on a continuous basis in a rotating cylinder. Pellets formed in this manner have a smooth surface.

The clay employed may be any of the usual clays. Bentonite is a preferred clay for this use but any clay, and preferably any of the cheaper clays, may be used, such as clays used for stoneware, sewer pipe, brick, pottery, terra cotta, roofing tile, etc. All of these clays after being mixed with sufficient water to make them plastic, and then dried, form a porous product. The clay bonds the porous fines from the popping of perlite into a porous mass. The dense skin which is formed on the surface of the pellets in any convenient manner, makes them substantially water impervious.

The aggregate may be produced in any one of a variety of different ways. For in instance, the fines and the clay may be mixed in dry powder form and water slowly added to the mixture while it is being stirred. As more and more water is added, the powder will gradually start to ball up and form small, wet, individual pellets. It is not necessary to add any more water than that required to form such pellets. The size of the pellets is regulated by the amount of water added and the extent of the mixing. Ordinarily sand-sized pellets will be most desirable for the variety of uses herein contemplated, although the pellets may be as large as of the order of a half inch, which definition is intended to define the largest size practical for use in concrete, plaster and building forms.

Another satisfactory way of producing the aggregate is to mix the fines and clay and sufficient water to form a plastic mass and then form this into pellets in a pelletizing machine, such as an extrusion device with a cutting knife which severs the extruded ribbons at frequent intervals.

The pellets, however formed, are then dried.

To produce the dense surface on the pellets they may be rolled while wet in any suitable device. This may be an eccentrically agitated horizontal pan or a cylinder rotated on an axis which is substantially horizontal but tilted sufficiently to cause the pellets to travel slowly from one end to the other. If such a cylinder is used the pellets may advantageously be dried in the lower portion of the cylinder. Alternatively, the dense skin may be formed by glazing the pellets in any suitable manner and in any suitable equipment, as by causing them to fall through a flame into a suitable cooling chamber.

However formed, the dried pellets have a porous interior formed of the clay and fines, and a substantially water impervious surface. A dense surface formed by rolling the wet pellets, will be substantially free of the fines because any fines will be forced by the rolling operation toward the interior of the pellets. By continued rolling, prior to drying, the thickness of the skin may be increased. A controlling factor in the density of the pellets is the ratio of the fines to the clay but the over-all density of the pellets may be controlled in part by the amount of water present during the rolling operation, and the amount of rolling. The density of the fines will vary from about two pounds to twelve pounds per cubic foot and ordinarily the density of the synthetic pellets may be varied from about eight to twenty-five pounds per cubic foot, but may be more or less.

The nature of the pellets is illustrated in the accompanying drawing which shows a cross section of a single pellet. It will be understood that the spacing of the fines 1, as illustrated in the mass of clay 2, is purely illustrative. As explained, the thickness of the skin 3, if produced by rolling, may be controlled by the amount of rolling and the amount of water present in the plastic during the rolling operation. If the skin is produced by glazing, changing the temperature and the length of the heating period will change the thickness of the skin. If the skin is not produced by glazing, then the pellet must be made by firing or calcining to make the pellet irreversible when wetted.

The invention will be further described in connection with the following examples.

Example 1

In this example 100 grams of fines from the popping of perlite (obtained in the popping of perlite) with a density of five and one-half pounds per cubic foot and with a mesh of minus 30 are mixed with 100 grams of powdered bentonite weighing fifty pounds per cubic foot. 400 ml. of water are added slowly while the mixture of fines and bentonite is stirred. The product becomes plastic and is extruded through a No. 8 mesh screen. The extruded pellets are dried in a pan which is held substantially horizontal while moved horizontally around an eccentric in order to roll the pellets over its surface. This rolling of the pellets produces a dense film on the surface of each and with continued rolling the pellets are dried and fired by heating them to 1600–2000° F. by the application of heat to the undersurface of the pan. This is not hot enough to produce a glaze.

The dried pellets will have a density of about nineteen pounds per cubic foot. They are suitable for use as aggregate in plaster, concrete and in the production of wallboards and other building forms.

Example 2

The pellets of wet clay and fines from the popping of perlite are formed in the manner described in Example 1, without rolling to produce a dense surface on them. The pellets, immediately after forming, are dried in a suitable way. Then they are heated to above 1800° F. to produce a surface glaze. Any equipment used in the industry for a comparable purpose may be employed. For example, the pellets may be placed in a heated rotary cylinder, which is substantially horizontal but tilted sufficiently to cause the pellets to travel slowly from one end to the other, the temperature to be above 1800° F. and sufficient to cause the surface skin to melt or soften and glaze.

The pellets have a density of about twenty to twenty-one pounds per cubic foot with exceptionally high crushing strength. They may be used in plaster, concrete and building forms.

The examples are illustrative. The ratio of the fines to the clay may vary between the limits of (1) 10 parts of fines to 90 parts of clay and (2) 90 parts of fines to 10 parts of clay. For instance, the ratio of the fines to clay may be 1:5, 1:4, 1:3, 1:2, 1:1, 2:1, 3:1, 4:1 or 5:1. Ordinarily about equal parts by weight of fines and clay will be employed but it is to be understood that the ratio of the two powdered materials may be varied to produce a product of a desired density, etc.

What I claim is:

1. Synthetic smooth-surfaced pellets for use as light-weight aggregate, composed of fines from the popping of perlite bonded together by clay, the pellets being porous with a substantially water-impermeable skin at the surface produced by firing the aforesaid composition, the density of the pellets being not substantially greater than twenty five pounds per cubic foot.

2. Synthetic smooth-surfaced pellets of a size from the size of sand up to one-half inch in diameter for use as light-weight aggregate, composed of fines from the popping of perlite bonded by bentonite, the pellets being porous with a substantially water-impermeable skin at the surface produced by firing the aforesaid composition, the density of the pellets being substantially eight to twenty five pounds per cubic foot.

3. Synthetic pellets of a size from the size of sand up to one-half inch in diameter for use as light-weight aggregate composed of fines from the popping of perlite bonded together by clay, the pellets being porous with a smooth substantially water-permeable skin at the surface produced by rolling the composition while wet and then firing, the density of the pellets being not substantially greater than 25 pounds per cubic foot.

References Cited in the file of this patent

UNITED STATES PATENTS

| Number | Name | Date |
|---|---|---|
| 295,298 | Smith | Mar. 18, 1884 |
| 662,516 | Barklage | Nov. 27, 1900 |
| 868,762 | Crow | Oct. 22, 1907 |
| 941,635 | Goldsmith | Nov. 30, 1909 |
| 1,239,221 | Rodman | Sept. 4, 1917 |
| 1,741,574 | Kraus | Dec. 31, 1929 |
| 1,788,625 | Levin | Jan. 13, 1931 |
| 2,342,574 | Denning | Feb. 22, 1944 |
| 2,526,073 | Gardner | Oct. 17, 1950 |
| 2,543,898 | DeVaney | Mar. 6, 1951 |
| 2,569,323 | Maynard | Sept. 25, 1951 |

FOREIGN PATENTS

| Number | Country | Date |
|---|---|---|
| 395,426 | Great Britain | of 1933 |

OTHER REFERENCES

Ralston Bureau of Mines Information Circular 7364, Aug. 1946, pages 5–7.